(12) United States Patent
Moos

(10) Patent No.: US 9,624,931 B2
(45) Date of Patent: Apr. 18, 2017

(54) PUMP UNIT

(71) Applicant: GRUNDFOS HOLDING A/S, Bjerringbro (DK)

(72) Inventor: Allan Moos, Hinnerup (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 292 days.

(21) Appl. No.: 14/369,034

(22) PCT Filed: Dec. 14, 2012

(86) PCT No.: PCT/EP2012/075498
§ 371 (c)(1),
(2) Date: Jun. 26, 2014

(87) PCT Pub. No.: WO2013/098091
PCT Pub. Date: Jul. 4, 2013

(65) Prior Publication Data
US 2014/0377085 A1    Dec. 25, 2014

(30) Foreign Application Priority Data
Dec. 27, 2011    (EP) .................................... 11195807

(51) Int. Cl.
*F04D 13/06*    (2006.01)
*H02K 11/33*    (2016.01)

(52) U.S. Cl.
CPC ........... *F04D 13/064* (2013.01); *F04D 13/06* (2013.01); *H02K 11/33* (2016.01)

(58) Field of Classification Search
CPC ....... F04D 13/064; F04D 13/06; H02K 11/33; H05K 2201/09754; H05K 2201/0999; H05K 5/006; H05K 7/142
(Continued)

(56) References Cited

U.S. PATENT DOCUMENTS 6,356,044 B1    3/2002    Archer
6,450,786 B1 *    9/2002    Koch ..................... F04D 13/06
                                                    417/423.1
(Continued)

FOREIGN PATENT DOCUMENTS

CN    1 941 550 A    4/2007
CN    2 918 804 Y    7/2007
(Continued)

OTHER PUBLICATIONS

Chinese Office Action dated Nov. 4, 2015.
(Continued)

*Primary Examiner* — Anthony Haughton
*Assistant Examiner* — Yahya Ahmad
(74) *Attorney, Agent, or Firm* — McGlew and Tuttle, P.C.

(57) ABSTRACT

A pump assembly with an electric drive motor and with an electronics housing (10). The electronics housing in which at least one first electrical circuit board (14) is arranged. On the circuit board electrical contacts (18) are formed. Via the electrical contacts, at least one electronic component (16), in the inside of the electronics housing (10) may be programmed. At least one opening (22), through which the electrical contacts (18) on the circuit board (14) are contactable from the outside, is formed on a wall (20) of the electronics housing (10).

20 Claims, 2 Drawing Sheets

(58) Field of Classification Search
USPC .................................................. 361/752–759
See application file for complete search history.

(56) References Cited

U.S. PATENT DOCUMENTS

| | | | | |
|---|---|---|---|---|
| 2007/0069841 | A1* | 3/2007 | Kusano | H02K 3/522 335/202 |
| 2008/0304988 | A1* | 12/2008 | Asaka | B60S 1/50 417/500 |
| 2010/0111729 | A1 | 5/2010 | Andersen et al. | |
| 2010/0247352 | A1* | 9/2010 | Hansen | F04D 13/06 417/410.1 |

FOREIGN PATENT DOCUMENTS

| | | |
|---|---|---|
| CN | 101 324 236 A | 12/2008 |
| CN | 201 481 450 U | 5/2010 |
| DE | 38 03 164 A1 | 8/1989 |
| DE | 199 23 350 A1 | 4/2000 |
| DE | 199 03 817 A1 | 8/2000 |
| DE | 100 05 505 A1 | 8/2001 |
| DE | 102 45 971 A1 | 4/2004 |
| DE | 20 2004 010 231 U1 | 11/2004 |
| DE | 10 2005 036 818 A1 | 2/2007 |
| EP | 1 947 343 A1 | 7/2008 |

OTHER PUBLICATIONS

First German opposition of Jun. 16, 2016.
Second German opposition of Jun. 14, 2016.
Alleged invoice of Dec. 18, 2007 to Carl-Thiem-Klinikum g GmbH, Thiemstrasse 111, 03048 Cottbus relating to an alleged sale of a metering pump under the description "MEDO II".
Installation and operating instructions relating to a metering pump under the description "MEDO II".
Photograph of a metering pump MEDO II.
Photograph of the metering pump MEDO II with an opened service compartment.
Photograph of the circuit board which is built in the metering pump MEDO II.
Operating manual "metering pump MEDO II" ("Dosierpumpe MEDO II") of Stegmann GmbH & Co KG having an alleged publication date of May 23, 2003.
Operating manual of the so-called programming tools in the version 1.1 allegedly issued on May 2001.

* cited by examiner

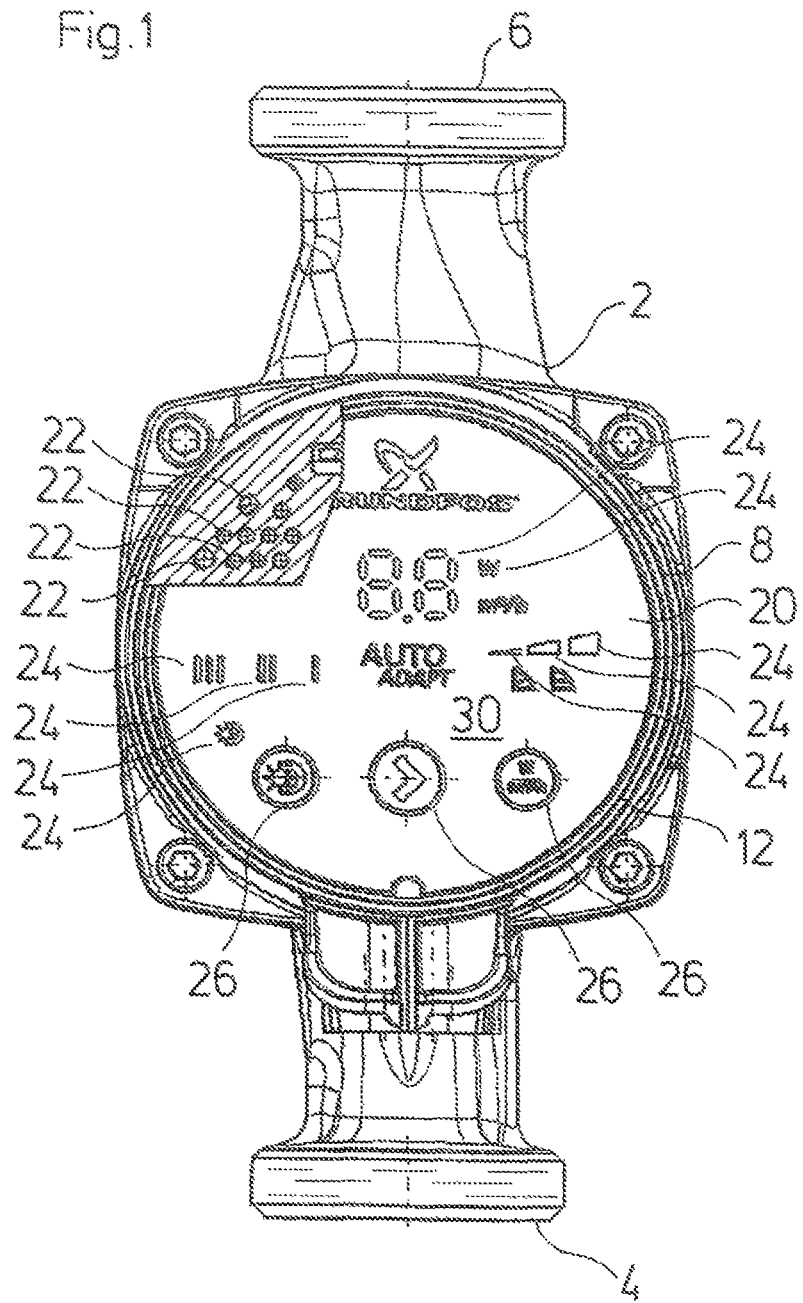

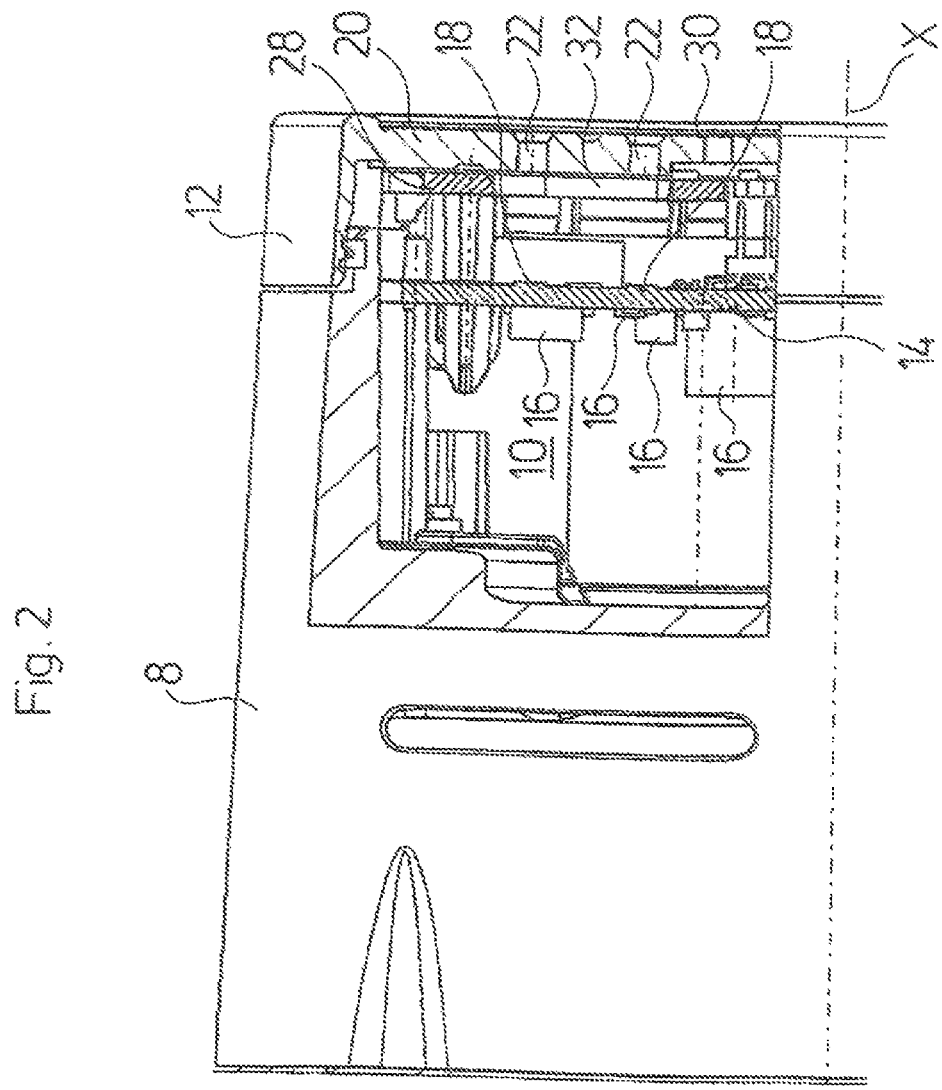

PUMP UNIT

CROSS REFERENCE TO RELATED APPLICATIONS

This application is a United States National Phase Application of International Application PCT/EP2012/075498 filed Dec. 14, 2012 and claims the benefit of priority under 35 U.S.C. §119 of European Patent Application EP 11195807.0 filed Dec. 27, 2011, the entire contents of which are incorporated herein by reference.

FIELD OF THE INVENTION

The invention relates to a pump assembly with an electric drive motor and with an electronics housing, in whose inside at least one first electrical circuit board is arranged, on which circuit board electrical contacts are formed, via which electrical contacts at least one electronic component in the inside of the electronics housing may be programmed.

BACKGROUND OF THE INVENTION

Pump assemblies are known, which comprise an electrical drive motor which is electronically controlled or regulated. For this, usually a terminal box or an electronics housing is arranged on the electric drive motor, in which terminal box or electronics housing electronic components for the control and regulation of the electrical drive motor are arranged. Thereby, it is known for these electronic components to be programmable, in order to assign them certain functions. Thus, it is possible for the same electronic components to be differently programmed for different applications or pump assemblies. For this, it is known to provide contacts in the inside of the electronics housing, via which contacts such a programming may be carried out. Thereby, this programming must usually be effected on the part of the factory before the finalizing assembly of the pump assembly or electronics housing.

SUMMARY OF THE INVENTION

With regard to the state of the art, it is an object of the invention to provide a pump assembly which still permits a programming of the electronics components for control and regulation of the pump assembly, even in a final assembled condition.

According to the invention, a pump assembly is provided comprising an electric drive motor, at least one electrical component, at least one first electrical circuit board; and an electronics housing with an inside in which the at least one first electrical circuit board is arranged. On the circuit board electrical contacts are formed, via which electrical contacts the at least one electronic component, in the inside of the electronics housing, may be programmed. The at least one opening, through which the electrical contacts on the circuit board are contactable from an outside, is formed in a wall of the electronics housing.

The pump assembly according to the invention as with known pump assemblies comprises an electrical drive motor. This electric drive motor may be arranged in the inside of a stator housing which is preferably connected directly to a pump housing, in which at least one impeller of the pump is arranged. The impeller is rotatingly driven via a shaft by the electric drive motor. Such a pump assembly may for example be a circulation pump assembly, in particular a heating circulation pump assembly, which usually form a construction unit consisting of an electrical drive motor and pump. Thereby, the electrical drive motor in particular is designed in a wet-running manner, i.e. as a canned motor.

The electrical drive motor comprises a terminal box or an electronics housing, in the inside of which at least one electronic component is arranged, which serves for the control or regulation of the electronic drive motor. Such a terminal box or such an electronics housing may be applied outside onto a stator housing of the electrical drive motor, in particular onto the axial end-side. Alternatively, the electronics housing may also be completely or partly integrated into the stator hosing of the electric motor, i.e. in particular be formed by a part of the stator housing of the drive motor itself.

Moreover, at least one first electric circuit board is arranged in the electronics housing, on which circuit board electrical contacts are formed, via which the at least one electronic component in the inside of the electronics housing may be programmed. For example, software for the operation of the electronic component may be inputted via these contacts into the electronic component and be deposited in a memory there. Other adaptations for programming may also be carried out via these contacts. Thus, different functions for the operation or for the control and regulation of the electrical drive motor may be programmed in the electronic component. In particular, thus a universally applicable electronic component may be adapted to different application purposes by way of different programming. Thus, for example, one and the same pump assembly may be adapted in a different manner for different applications, alone by way of a different setting of the control and regulations electronics. Alternatively, it is also conceivable to apply the same electronics for different drive motors or pumps, and in this context to carry out a different programming of the electronic component.

Thereby, the electrical contacts preferably exclusively serve for the basic programming of the at least one electronic component, in particular on the part of the factory, and moreover have no further communication functions. I.e. the contacts do not serve for the communication with further electronic control apparatus or remote control apparatus on operation of the pump assembly. I.e. preferably no further settings are carried out via the contacts once in running operation.

According to the invention, at least one opening is formed in a wall of the electronics housing, through which wall the electrical contacts on the circuit board may be contacted from outside. This permits the at least one electrical component to be programmed from the outside also in the completed assembled condition of the pump assembly and of the electronics housing. The manufacture and assembly is simplified by way of this, since firstly the pump assembly may be completely assembled and the programming of the electronic component may be effected towards the end of the production or assembly. I.e. it becomes possible to set the precise function of the control or regulation electronics by way of programming not until towards the end of the manufacturing process. It is also possible to store finished assembled pump assemblies and to externally program the electronics or the at least one component just before the delivery, in a manner depending on the desired demands. Contact pins may be introduced through the at least one opening into the inside of the electronics housing and there may contact the contacts on the circuit board for its programming.

One may make do without the arrangement of a special plug contact on the outer side due to the fact that the contacts on the circuit board in the inside of the electronics housing may be directly contacted through at least one opening in the housing wall. This on the one hand simplifies the construction of the pump assembly and furthermore the contacts for programming may be arranged in a protected manner in the inside of the electronics housing, so that they are protected from accidental contacting.

The wall of the electronics housing, in which the at least one opening is formed, is preferably an outer wall which is away from the electrical drive motor, in particular an outer wall which is opposite to the electrical drive motor. Such an outer wall is also well accessible after the assembly of the electronics housing on the drive motor, wherein the at least one opening is also well accessible and contact pins or contact elements for contacting the contacts on the circuit board and for programming the electronic component may be introduced easily from the outside into the inside of the electronics housing.

Further preferably, the wall of the electronics housing, in which the at least one opening is formed, is a wall on which display elements and/or operating elements are arranged. Particularly preferably, all display elements and/or operating elements of the pump assembly are arranged on this wall. In this manner, all display elements and operating elements and the at least one opening for programming are bundled on a wall of the electronics housing which is easily assessable from the outside.

According to a further preferred embodiment, at least one second circuit board is arranged in the inside of the electronics housing below the wall and this second circuit board comprises a recess at least in a region which is situated below the at least one opening in the wall. This second circuit board in particular may be provided for contacting or carrying operating elements and/or display elements which are arranged on the wall of the electronics housing. I.e. this circuit board is preferably arranged directly below the wall or, as the case may be, also integrated into the wall. The first circuit board which carries the contacts for programming the at least one electronic component lies further distanced to the wall of the electronics housing, i.e. below the second circuit board. In order, despite this, to be able to contact the contacts on the first circuit board through the opening in the wall, the second circuit board is recessed in the region of the openings, so that the projection or alignment between the at least one opening and the contacts on the first circuit board for programming the at least one electronic component is not blocked. I.e. contact elements or contact pins which for contacting the contacts on the first circuit board for programming the electronic component, are introduced through the at least one opening of the wall into the electronics housing, pass the second circuit board in the region of its recess.

Particularly preferably, the electronics housing is applied onto the axial face-end of a stator housing of the electronic drive motor. The wall of the electronics housing, in which the at least one opening is formed, is moreover preferably an axial end-wall of the electronics housing. Inasmuch as this is concerned, the wall, in which the at least one opening is formed and on which preferably operating elements and/or display elements are situated, is an axial end-side of the complete pump assembly which is well assessable from the outside also in the installed condition of the pump assembly. This is particularly advantageous if the programming is not to be carried out on the part of the factory, but on location in the installed condition of the pump assembly, for example when the pump assembly is already installed in a heating installation. It is then possible for a mechanic or fitter to carry out a basic programming of the electronic component, for example, in order to adapt the pump assembly to the heating installation. Thereby however, one envisages no further information for setting the regulation or control of the electrical drive motor being transmitted via the contacts on the first circuit board later with running operation.

Particularly preferably, several openings are formed in the wall, wherein preferably in each case an electrical contact may be contacted from the outside through each of the openings. I.e. preferably in each case, an opening lies opposite a contact on the circuit board. This has the advantage that the openings themselves may be designed in a relatively small manner, specifically so small, that a contact element or contact pin may just be led through the opening, in order to contact the contact. The opening thereby may simultaneously serve for guiding the contact element or contact pin.

According to a further preferred embodiment of the invention, a closure element is present, with which the at least one opening may be closed. The closure element may be designed for the permanent closure of the at least one opening. The closure element serves for closing the opening after the programming, in particular in a sealed manner, so that no moisture may penetrate from the outside through the opening into the electronics housing.

According to a special embodiment, the closure element may be releasable from the wall, i.e. is not designed for the permanent closure of the opening. This permits the opening to be opened once again after the programming, in order for example to carry out a reprogramming or to be able to transmit a software update to the electronic component.

The closure element may for example be designed for being bonded to the wall or be bonded to the wall. A sealed closure of the opening with the closure element may be achieved by way of bonding. Moreover, a permanent or releasable bonding is possible depending on the type of applied adhesive.

Particularly preferably, the closure element is formed by a cover film which covers the wall on its outer side. This cover film forms the outer closure of the outer wall and may thus simultaneously close the at least one opening in the wall. The cover film may moreover effect a desired aesthetic fashioning of the outer side of the wall. Thus, the cover film may in particular also carry an inscription or lettering. Thus, for example, manufacturers details as well as operating instructions may be attached or printed on the cover film. In particular, the cover film may carry a symbol or lettering for the display elements and/or operating elements which are arranged on the wall.

Thereby, the cover film particularly preferably also covers the operating and/or display elements which are provided on the wall. Thereby, the cover film may be designed in an elastically deformable manner in the region of the operating elements, so that operating elements such as push switches or push buttons may be actuated from the outside by way of deformation of the cover film. In particular, the cover film may be designed in a transparent or at least partly transparent manner in the region of the display elements, so that the display elements such as light diodes for example which are arranged on the wall below the cover film, may shine through the cover film. For example, a display may also be arranged below the cover film and thus cover film may be designed in a transparent manner at least in the region above the display. The cover film thereby preferably covers all openings in the wall, in particular also the openings for the operating elements and/or display elements and the at least one opening for the programming. Thus all openings are sealingly closed by the cover film and the cover film prevents a penetration of moisture into the inside of the electronics housing.

Particularly preferably, at least one part of a frequency converter for the control or regulation of an electrical drive motor is arranged in the electronics housing. The electronic component which is programmable from the outside in the previously described manner, thereby preferably represents a component which is part of a frequency converter or cooperates with this.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partly sectioned, axial plan view of a pump assembly according to the invention; and FIG. 2 is a partly sectioned lateral view of the stator housing of the pump assembly according to FIG. 1.

DESCRIPTION OF THE PREFERRED EMBODIMENTS

Referring to the drawings in particular, the pump assembly in the known manner comprises a pump housing 2 with a suction connection 4 and a pressure connection 6 as well as an impeller (not shown here) arranged in the inside of the pump housing. A motor housing or stator housing 8 is applied onto the pump housing 2 on the axial side, i.e. in the direction of the rotation or longitudinal axis X, in which motor housing or pump housing an electric drive motor for the drive of the impeller in the inside of the pump housing 2 is located. With regard to this, the shown pump assembly corresponds to conventional heating circulation pump assemblies. In particular, the electric drive motor which is not shown in more detail here may be designed as a wet-running electric drive motor with a can.

The stator housing 8 in its inside and in the region of the axial end which is away from the pump housing 2 forms an electronics housing 10 which is closed by a cover 12 at the axial end of the stator housing 8. A first circuit board 14 which carries electronic components 16 for the control or regulation of the electrical drive motor of the pump assembly is arranged in the inside of the electronics housing 10. Apart from e.g. components of a frequency converter, the circuit board 14 carries electronic components which are programmable, in order to execute certain regulation or control functions of the pump assembly in a program-controlled manner. Contacts 18 are arranged on the side of the circuit board 14 which faces the axial end of the stator housing 8 closed by a cover 12, in order to be able to program these electronic components 16. These electrical contacts 18 may be contacted by a control or programming apparatus via suitable contact elements, in order to carry out the programming of the electronic components 16 on the circuit board 14 from the outside, for example in order to be able to input software or firmware into the electronic components from the outside.

The first electrical circuit board 14 extends parallel to the end-side wall 20 of the cover 12, i.e. normally to the longitudinal axis or rotation axis X. Openings 22 in the form of through-holes are formed in the end-side wall of the cover 12, in order to be able to contact the contacts 18 from the outside, also in the closed condition of the electronics hosing 10. The openings 22 lie opposite the contacts 18, wherein in each case one opening 22 lies opposite exactly one contact 18. However, it would also be conceivable to design the openings in a larger manner, so that an opening 22 lies opposite several contacts 18. With the design shown here, it is possible to lead a contact pin through each of the openings 22 and to contact the oppositely lying contact 18 from the outside and then to transmit electrical signals to the electronic components 16 for their programming, via the contacts 18. The openings 22 thereby may simultaneously serve for guiding the contact pins.

The programming which is carried out in this manner, is a basic programming, in particular, a programming on the part of the factory and which as a one-off adapts the electronic components for the control or regulation of the pump assembly to the desired application case, for example, programs the electronic components in dependence on the application purpose of the pump assembly. The contacts 18 are not envisaged to transmit or receive control signals or regulation signals for adaptation of the control or regulation of the pump assembly during running operation of the pump assembly.

As is shown in FIG. 1, display elements 24 and operating elements 26 are arranged on the wall 20 of the cover 12. With this embodiment, the display elements 24 are designed as light diodes and the operating elements as push buttons 26. The electronic or electrical components of the operating elements or display elements are arranged on a second circuit board 28 which is situated in the inside of the electronics housing 10 directly below the wall 20 or directly adjacent the wall 20. The circuit board 28 extends parallel to the circuit board 14 and the wall 20, i.e. essentially normally to the longitudinal axis X. Openings are formed in the wall 20 at the locations where the operating elements 26 or the display elements 24 are situated on the circuit board 28, so that the display elements are visible from the outside and the operating elements 26 may be actuated from the outside. The wall 20 on its outer side is covered by a cover film 30 which covers the complete end-face of the cover 12, i.e. essentially the complete wall 20 on its outer side. The cover film 30 carries the lettering and symbols for the operating elements and display elements and is designed in a transparent or part-transparent manner in the region of the display elements 24. The film is elastically deformable in the region of the actuation elements 26, so that with a pressure on the actuation elements 26, push buttons situated below the film 20 may be actuated amid the deformation of the cover film 20.

The cover film 30 also covers the openings 22 and closes these. The cover film 30 is bonded onto the wall 20 in a large-surfaced manner, so that all openings in the wall 20, in particular the openings 22, are sealingly closed.

Thus, on manufacture of the pump assembly, it is possible to assemble the complete pump assembly with the exception of the cover film 30. The electrical contacts 18 for programming the electronic components 16 and which are located below the openings 22 may be contacted by way of the insertion of contact pins into the openings 22. After the programming has been effected, the cover film 30 may be bonded onto the wall 20, wherein to finish, the electronics housing 10 and the openings 22 then are closed.

As the case may be, the cover film 30 may be designed in a releasable manner, so that e.g. the bonding connection between the cover film 30 and the wall 20 may be released again, in particular, so that the cover film 30 may be pulled off, in order to release the openings 22 again, in order for example to be able to carry out a new programming or a software update by way of contacting the electrical contacts 18. Subsequently, the cover film 30 or a new cover film 30 for closing the openings 22 is bonded onto the wall 20 again.

One may recognize in FIG. 2 that the second circuit board 28 comprises a recess 32 in the region below the openings 22. This permits contacts pins inserted into the openings 22 to be able to extend through the recess 32 in the second circuit board 28, in order to contact the contacts 18 on the first circuit board 14 which is situated below the second circuit board 28.

While specific embodiments of the invention have been shown and described in detail to illustrate the application of the principles of the invention, it will be understood that the invention may be embodied otherwise without departing from such principles.

The invention claimed is:

1. A pump assembly comprising:
an electric drive motor;
at least one electrical component;
at least one first electrical circuit board; and
an electronics housing with an inside in which the at least one first electrical circuit board is arranged, on which circuit board electrical contacts are formed, via which electrical contacts the at least one electronic component, in the inside of the electronics housing, may be programmed, said circuit board electrical contacts being arranged completely inside of the electronics housing, wherein at least one opening, through which the electrical contacts on the circuit board are contactable from an outside, is formed in a wall of the electronics housing.

2. A pump assembly according to claim 1, wherein the wall of the electronics housing, in which the at least one opening is formed, is an outer wall which is away from the electrical drive motor.

3. A pump assembly according to claim 1, further comprising one of display elements and operating elements arranged on the wall of the electronics housing, in which the at least one opening is formed.

4. A pump assembly according to claim 1, further comprising at least one second circuit board arranged in the inside of the electronics housing below the wall, said at least one second circuit board comprising a recess at least in a region which is situated below the at least one opening in the wall.

5. A pump assembly according to claim 1, wherein the electronics housing is applied onto an axial face-end of a stator housing of the electrical drive motor.

6. A pump assembly according to claim 1, wherein the wall of the electronics housing, in which the at least one opening is formed, is an axial end-wall of the electronics housing.

7. A pump assembly according to claim 1, wherein several openings are formed in the wall.

8. A pump assembly according to claim 1, further comprising a closure element is present, with which the at least one opening may be closed.

9. A pump assembly according to claim 8, wherein the closure element is releasable from the wall.

10. A pump assembly according to claim 8, wherein one of:
the closure element is designed for bonding to the wall; and
the closure element is bonded to the wall.

11. A pump assembly according to claim 8, wherein the closure element is formed by a cover film covering the wall on an outer side.

12. A pump assembly according to claim 11, wherein the cover film carries an inscription.

13. A pump assembly according to claim 11, further comprising at least one of display elements and operating elements arranged on the wall of the electronics housing, in which the at least one opening is formed wherein the cover film covers the at least one of display elements and operating elements.

14. A pump assembly according to claim 1, wherein at least a part of a frequency converter for controlling the electrical drive motor is arranged in the electronics housing.

15. A pump assembly according to claim 1, wherein the electrical contacts are provided exclusively for a basic factory programming of the electronic component and have no further communication function, wherein several openings are formed in the wall, wherein in each case an electrical contact, on the circuit board, is contactable from the outside, respectively through each of the openings.

16. A pump assembly according to claim 1, wherein the pump assembly is designed as a circulation pump assembly with a wet-running electric drive motor.

17. A pump assembly comprising:
an electric drive motor;
an electrical component;
an electrical circuit board comprising circuit board electrical contacts;
a cover comprising at least one cover opening;
an electronics housing, said cover closing one end of the electronics housing, the cover and the electronics housing defining an interior space, the electrical circuit board and the circuit board electrical contacts being arranged in the interior space, the electrical component being programmable in the interior space via at least the circuit board electrical contacts, the circuit board electrical contacts being completely arranged between the cover and the electrical circuit board, wherein the circuit board electrical contacts are contactable from an outside via the at least one cover opening.

18. A pump assembly according to claim 17, further comprising at least one second circuit board arranged in the interior space below the cover, said at least one second circuit board comprising a recess at least in a region which is situated below the at least one cover opening.

19. A pump assembly comprising:
an electric drive motor;
an electrical component;
an electrical circuit board comprising circuit board electrical contacts;
a cover comprising at least one cover opening;
an electronics housing, said cover closing one end of the electronics housing, the cover and the electronics housing defining an interior space, each portion of the electrical circuit board and each portion of the circuit board electrical contacts being completely arranged in the interior space, the electrical component being programmable in the interior space via at least the circuit board electrical contacts, wherein the circuit board electrical contacts are contactable from an outside via the at least one cover opening.

20. A pump assembly according to claim 19, further comprising at least one second circuit board arranged in the interior space below the cover, said at least one second circuit board comprising a recess at least in a region which is situated below the at least one cover opening.

* * * * *